United States Patent [19]

Ise et al.

[11] Patent Number: 4,745,392
[45] Date of Patent: May 17, 1988

[54] NOISE REDUCTION IN SIGNAL TRANSMISSION SYSTEM OVER BUILDING POWER DISTRIBUTION WIRING

[75] Inventors: Masahiko Ise, Kashihara; Katsuyuki Machino, Nara; Hidehiko Tanaka, Tenri; Takaaki Okamoto, Nara, all of Japan

[73] Assignee: Sharp Kabushiki Kaisha, Osaka, Japan

[21] Appl. No.: 436,931

[22] Filed: Oct. 27, 1982

[51] Int. Cl.$^4$ ............................................. H04M 11/04
[52] U.S. Cl. ..................................... 340/310 R; 375/99
[58] Field of Search .............. 340/310 R; 179/84 VF, 179/170 E; 381/94, 47; 375/99; 371/6; 364/574

[56] References Cited

U.S. PATENT DOCUMENTS

| | | | |
|---|---|---|---|
| 3,523,278 | 8/1970 | Hinkel | 371/6 |
| 3,855,575 | 12/1974 | Leuschner | 375/99 |
| 3,879,665 | 4/1975 | Carlow | 375/99 |
| 4,297,533 | 10/1981 | Gander | 375/99 |
| 4,348,657 | 9/1982 | Merkel | 340/310 R |
| 4,414,534 | 11/1983 | Whidden | 340/568 |
| 4,559,520 | 12/1985 | Johnston | 340/310 R |

OTHER PUBLICATIONS

IBM Technical Disclosure Bulletin, Adams, vol. 17, No. 3, Aug. 1974, pp. 911–912.

Primary Examiner—John W. Caldwell, Sr.
Assistant Examiner—Tyrone Queen
Attorney, Agent, or Firm—Birch, Stewart, Kolasch & Birch

[57] ABSTRACT

A signal transmission system over building or house wiring includes noise reduction circuit to reduce noise including asynchronous noise and synchronous noise. Received pulses are sampled in a given interval and the number of continous pulses in question during the sampling interval is counted. The pulses in question are ignored as noise if the number of pulse counting is less than a predetermined reference count and the pulses are treated as true signals if the number is more than said reference count.

5 Claims, 6 Drawing Sheets

NOISE REDUCTION IN SIGNAL TRANSMISSION SYSTEM OVER BUILDING POWER DISTRIBUTION WIRING

BACKGROUND OF THE INVENTION

This invention relates to a signal transmission system over building or house wiring and more particularly to a noise reduction circuit in such a signal transmission system.

It is known in the art of signal transmission that, in a transmission system of the type which utilises building or house wiring for power distribution, digital data included in carriers are transmitted and received via indoor power lines in synchronism with the utility power frequency for building security or other purposes. For such system, it is necessary to remove any kind of noise from the carriers prior to proper treatment of signals. There are generally two kinds of noise, asynchronous noise (i.e., random noise) and synchronous noise (i.e., thryristor noise).

OBJECT AND SUMMARY OF THE INVENTION

Accordingly, it is an object of the present invention to provide a noise reduction circuit which fulfills the requirements as discussed above.

It is another object of the present invention to provide a noise reduction circuit for use in a signal transmission system using building or house wiring which is highly reliable, but simple, in removing random noise, often overlying sinewave signals, and power line phase-related noise.

According to the present invention, the above objects are achieved by providing a signal transmission system over building or house wiring which comprises means for sampling signals in question in a given interval, means for counting the number of continued signals during the sampling interval, and means for ignoring the signals in question as noise if the number of pulse counting is less than a predetermined reference count and for treating the signals in question as proper or true signals if the number is more than said reference count.

In another preferred aspect of the present invention, 2-bit binary data "10" and "01", in place of "1" and "0", are placed during each of sampling interval, corresponding to $1/N$ ($N=1, 2, \ldots$), of the full or half cycle of the utility power voltage for signal transmission. In receiving the data, the number of carriers is counted and the preceding count during the sampling intervals is subtracted therefrom. The resulting difference is used in deciding whether the signals now received are noise or true signals.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
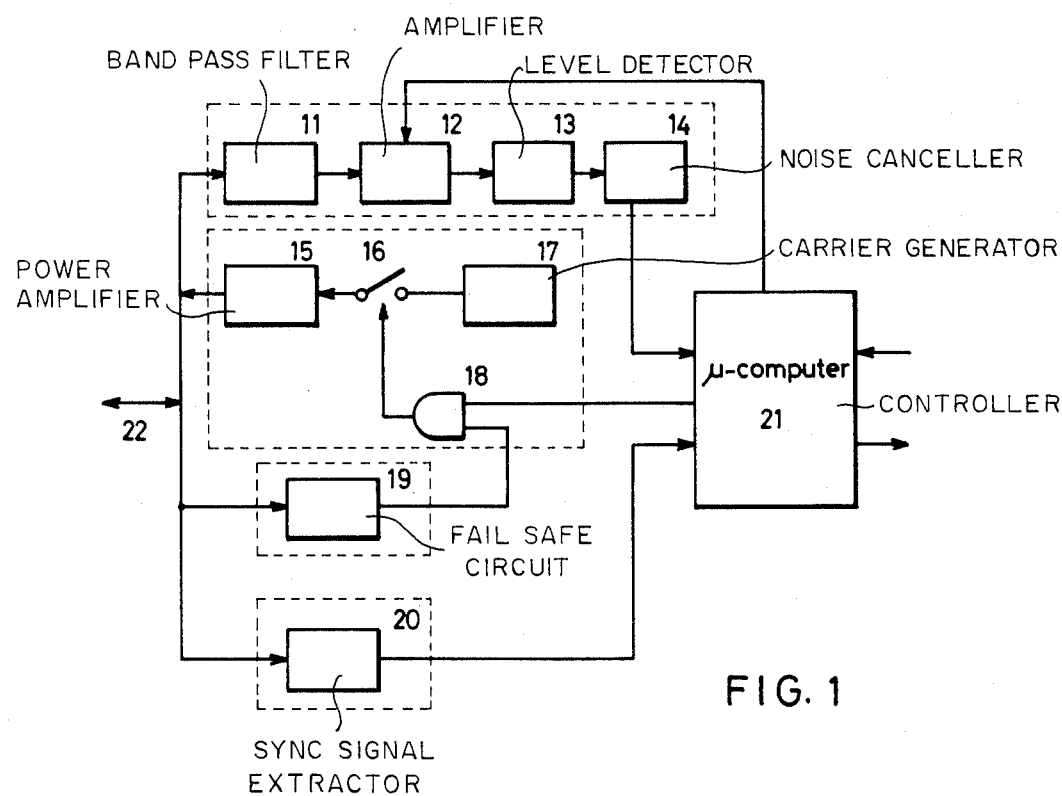
FIG. 1 is a diagram schematically illustrating a signal transmission signal utilizing house wiring according to an embodiment of the present invention.

Referring now to FIG. 1, there is illustrated the whole of a signal transmission system over house wiring which generally includes a band pass filter 11, an amplifier 12, a level detector 13, a noise canceler 14, a power amplifier 15, a switch 16, a carrier generator 17, a logic gate 18, a fail-safe circuit 19, a sync signal extractor 20 and a controller 21 typically set up of a one-chip microcomputer. With such an arrangment, house wiring 22 carries the utility power voltage, typically 60 Hz and 100 volts, and a carrier of typically 40 KHz superimposed on the utility power voltage. Obviously, the carrier is generated by the carrier generator 17. The band pass filter 11 extracts high frequency components from the house wiring 22 and the amplifier 12 amplifies the high frequency components up to a sufficient level suitable for satisfactory working of the level detector 13. The noise canceler 14 which plays an important role in the present invention, by removing any random noise from the high frequency components. Received data from the noise canceler 14 is fed to the controller 21 which is also responsive to an input from a sensor or enabled actuator. The fail-safe circuit 19 monitors to see if the controller 21 falls into run-away state. Under the normal state of the whole system, transmitted data is fed via the logic gate 18 and the switch 16 to the power amplifier 15. The sync extractor 20 converts the sinewaveform of the power line voltage waveform into a square wave.

In the case where random noise with a level higher than a predetermined level is present after signals are passed through a resonance circuit for signal detection, it is impossible to decide merely from level detection whether the signals are true or appropriate. See FIGS. 3(a), 3(b) and 3(c) where FIG. 3(a) indicates the waveform of noise passing through the resonance circuit 11, FIG. 3(b) indicates the output of the level detector 13 and FIG. 3(c) indicates an enlargement of section A in FIG. 3(b). It is noted that the resonance circuit is used for setup of the band pass filter 11. As is clear from FIG. 3(c), the possibility that nose occurs continuously or lasts for a long time is very rare. Since only resonance frequency components are extracted from original noise through operation of the resonance circuit 11, the resultant waveform bears a form that is AM modulated at random at the resonance frequency. The time where signals last can be evaluated from the count of the continuous stream of pulses corresponding to the resonance frequency which exceeds a detection level.

Figure 4:
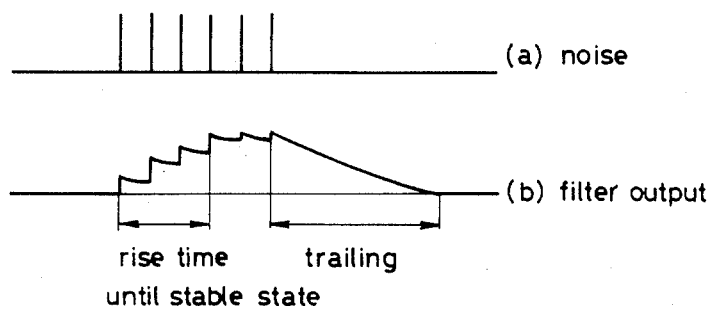
FIGS. 4(a) and 4(b) are diagrams showing impulsive noise and the output of a low-pass filter, respectively.

Provided that the noise reduction procedure of monitoring of signal continuity is carried out with a known analog method (using a low-pass filter or an integrator), selection of its cut-off frequency is rather diffcult and response characteristics become worse. For the convenience of illustrating level fluctuations only, the result from intervention of the low-pass filter on the output of the level detector is given in FIG. 4(b), suggesting that, with a decrease of the cut-off frequency (1/time constant in case of the integrator), noise components are suppressed but rise time until normal state and trailing time become longer. Therefore, if the signals in question appear in the region where the rate of noise component is high compared with signal, effective removal of noise cannot be expected. In such a case, the impact of noise can be effectively eliminated by counting the number of pulses in digital fashion and disregarding the pulses in question if the count is less than a predetermined reference value.

Figure 5:
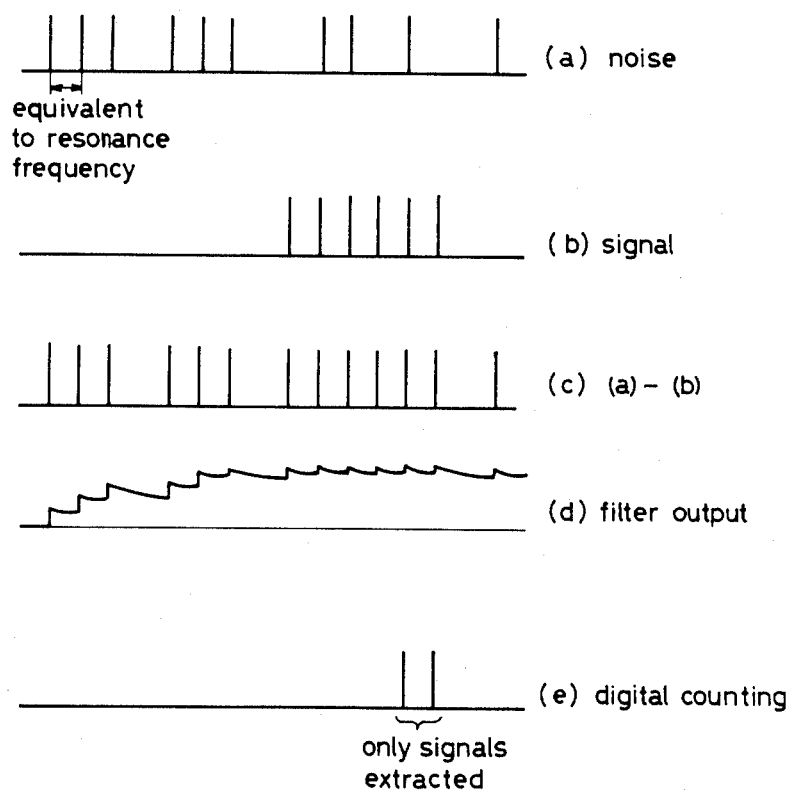
FIGS. 5(a), 5(b), 5(c), 5(d) and 5(e) are diagrams showing noise, signals, the sum of the noise and signals, the output of the low-pass filter and outputs resulting from digital counting method, respectively.

Assuming less than three continuous noise pulses and six signal pulses are present as indicated in FIGS. 5(a) and 5(b) (and 5(c)), comparison between FIG. 5(d) showing the effect of the low-pass filter and FIG. 5(e) showing that of digital processing proves the superiority of the latter. We assume that in this case the resonance frequency agrees with the signal frequency. In other words, the pulses after passing over the low-pass filter are given in FIG. 5(d), which face the difficulties in setting a proper detection level and extracting only signal components in an effective manner. The digital counting method as indicated in FIG. 5(e), on the other hand, serves to accept the pulses in question as effective or true signals when more than five pulses appear in continuous fashion, thus ensuring precise extraction of the effective signal components only.

Figure 6:
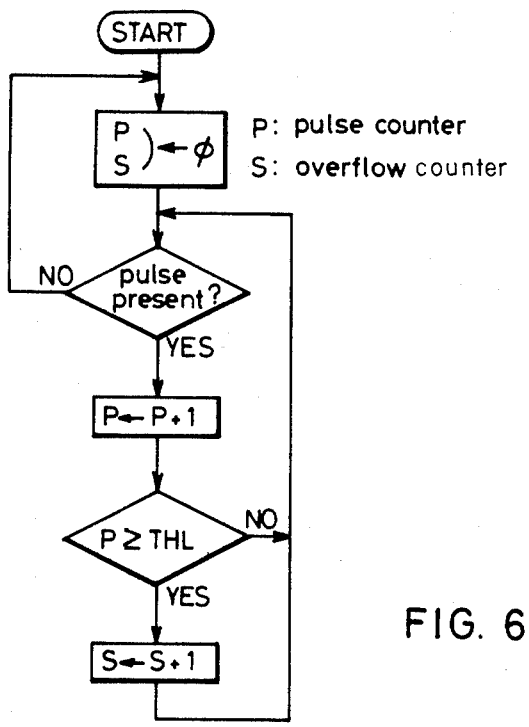
FIG. 6 is a flow chart showing an algorithm for noise/signal decision.

A processing algorithm of the present invention is depicted in a flow chart of FIG. 6 wherein a pulse counter is denoted by P and an overflow counter for counting pulses exceeding a setting is denoted by S. These counters are reset to zero immediately after pulses disappear at any sampling interval. The pulses present at the sampling intervals are subject to addition and whether the sum of the pulses is more than a predetermined threshold setting THL is then decided. Unless the threshold level THL is reached, the system decides if any pulses are present at the interval of sampling. If this step reveals that no pulses are present at the interval of sampling as before, then the counters P and S are reset to zero, bringing the whole system to its initial state. Should any succeeding pulses be present and the sum of counts exceed the threshold setting THL, the counter S is incremented, with its count treated as those indicative of signal components. Thereafter, the system returns to the primary step of deciding if any pulses are present at the interval of sampling and repeats the same procedure as mentioned above.

It is obvious from the foregoing that, if the threshold level or sampling interval is selected to be longer than the lenghth of time that impulsive noise usually lasts, the effect of noise removal is further improved.

Figure 7:
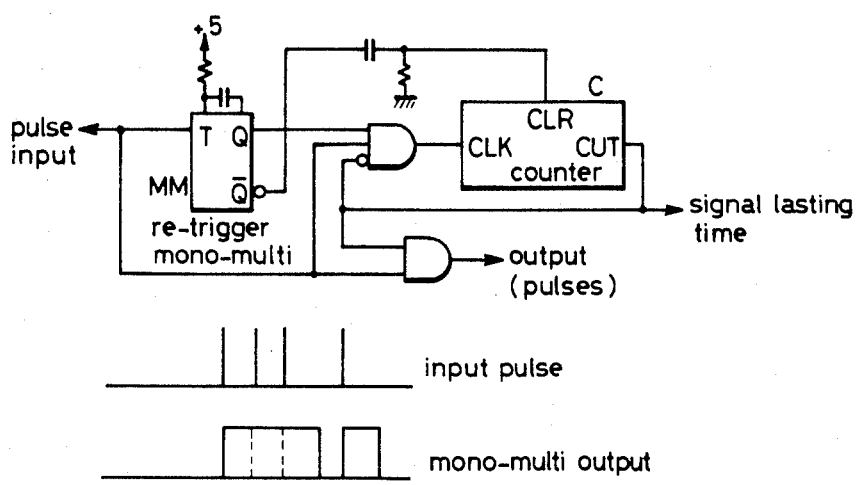
FIG. 7 is a block diagram showing an example of a noise canceler in FIG. 1.

The algorithm as indicated in FIG. 6 is implemented with a known microcomputer as long as its arithmetic speed is high. That is, it is impossible to do so if the signal frequency is higher than 10 KHz. In such a case, this process is achieved by a random logic scheme an example of which is given in FIG. 7. The step of sampling to decide if any pulses are present at the interval of signals is achieved when a retriggerable type monostable multivibrator MM of FIG. 7 has a time constant $\tau_M$ longer than the signal interval $T_s$ but shorter than twice the signal interval (i.e., $T_s < \tau_M < 2T_s$). Once the threshold counting has been reached, the counter C does not vary in count until the output of the retriggerable monostable multivibrator falls. Therefore, the output of this counter implies the signal duration. When measurement of the signal duration is undertaken by the microcomputer, it is more preferable that its internal counter be used to count the carriers and the output of the counter and the input pulses be AND'gated.

Figure 8:
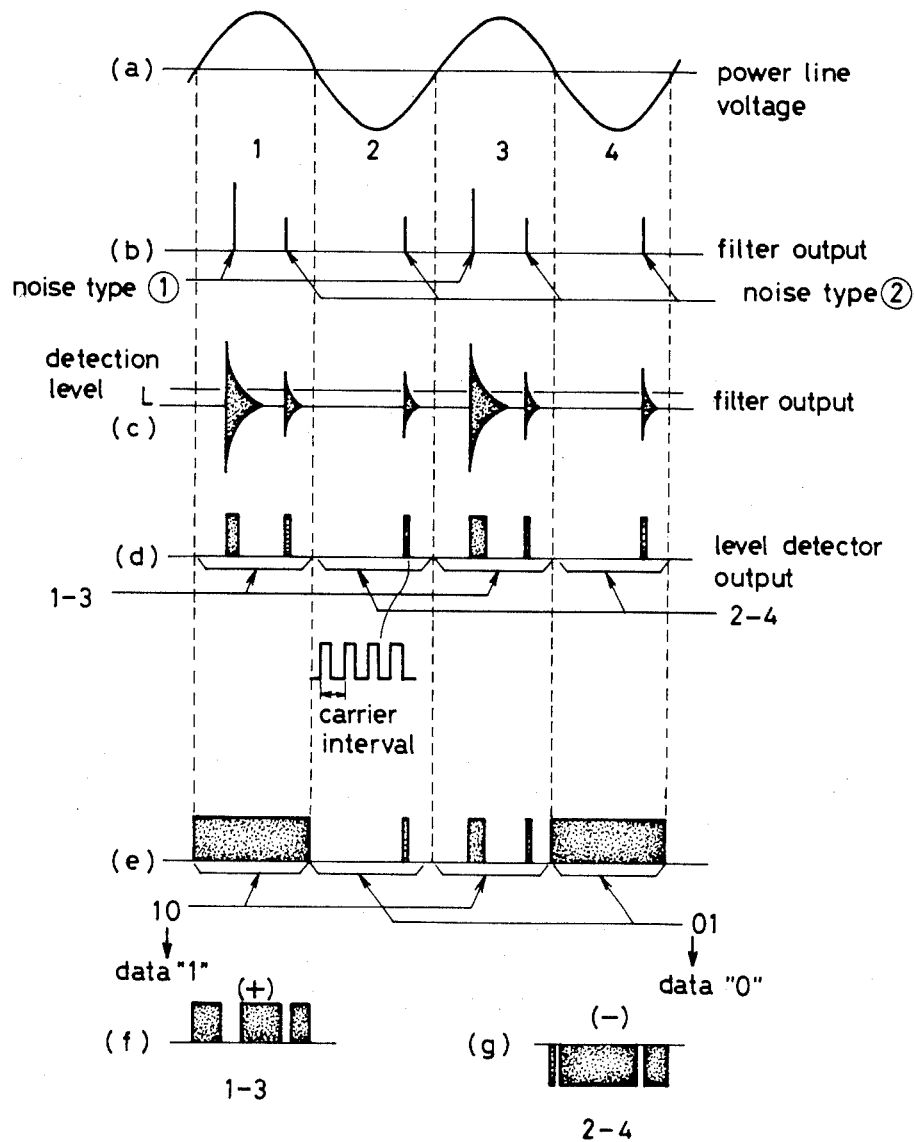
FIGS. 8(a) to 8(g) are time charts showing the waveforms of various signals for explaining operation of another embodiment of the present invention.

The noise reduction scheme is not effective in reducing the so-called thyristor noise which often occurs in the signal transmission system over building or house wiring in synchronism with the utility power frequency (for instance, 50 or 60 Hz). An additional technique is therefore required to fulfill the demand for perfect reduction of noise. Observation of voltages running through the house wiring and the hi-pass filter indicates that, as indicated in FIG. 8(b), there is included an impulsive noise of a high level (max: about 20 volts) and a short duration of about 5 μs synchronous with the utility power voltage in FIG. 8(a). This synchronous noise is generally classified into two groups: (1) noise occurring in the same phase at one cycle of the power frequency and (2) that occurring twice whose phase difference is 180° in one cycle of the power frequency, while the former is rare and the latter is common. In the event that pulses in question are conveyed through a filter tuned to the carrier frequency, it is possible that impulse noise may excite the resonance circuit and give rise to dampened oscillation at the carrier frequency as viewed in FIG. 8(c). In case of AM transmission, the decision as to whether true signals are present or not is based upon whether there is any signal whose level exceeds an appropriate detection level. Should the detection level be set at L in FIG. 8(b), the output of the level detector is given in FIG 8(d). Pursuant to the teachings of the present invention, taking notice of the definite fact that such noise is unavoidable, the decision as to whether true signals are available is made dependent upon the length of the time where signal components corresponding to the carriers during the half or full cycle of the power frequency last in succession. Another factor which should be considered in assuring highly reliable transmission of signals is difficulties in removing the impact of impulse noise even if the output of the level detector is filtered through the low-pass filter where the density of impulse noises is substantially high.

In the digital subtraction method embodying the present invention, noise/signal discrimination may be carried out in any interval of time (for instance, less than the half cycle of the power frequency). To cope with the first type of noise (1) which occurrs every full cycle, 2-bit binary data "10" or "01" are superimposed on the carriers during the corresponding half cycles in two consecutive full-cycles (for instance, the first and third half cycles or the second and fourth half cycles) for signal transmission. During reception of signals pulses in question are regarded as "signal" when the difference between the counts of the carriers during each of the half-cycles is larger than a reference setting and otherwise regarded as "noise." It is already noticed that data "10" and "01" may represent binary bit "0" or "1." The word "half cycle" is used herein to define an interval begining with 0° and ending with 180°, whether its phase is positive or negative. The full cycle, on the other hand, implies an interval beginning with 0° and ending with 360°.

The subtraction or down-counting is executed between the preceding half-cycle and the succeeding half-cycle and the resulting difference is zero when only noise as shown in FIG. 8(d) is present. As a matter of fact, the above mentioned situation is however very rare but the situation where the differential count is less than the reference setting is treated in the same manner. However, when signals are transmitted in terms of "01" and "10" and the output of the level detector as in FIG. 8(e) is derived, the subtractions give its results as depicted in FIGS. 8(f) and 8(g) where the data signals are definitely distinguishable from noise. It is understood that FIG. 8(f) schematically shows the subtraction between the first and third half-cycles and FIG. 8(g) shows that between the second and fourth half-cycles.

Figure 2:
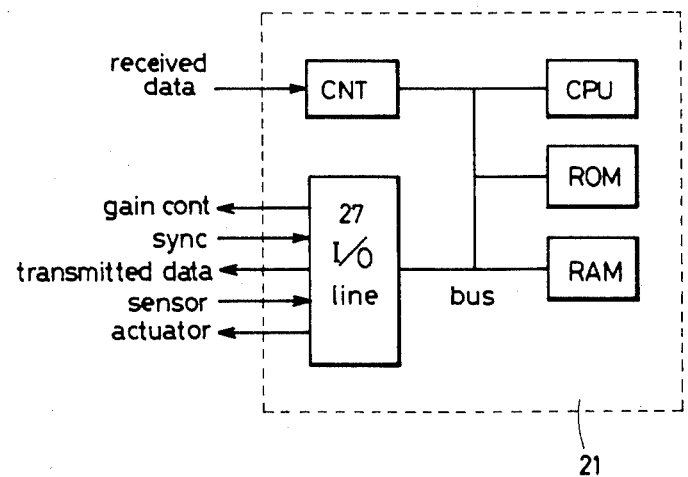
FIG. 2 is a schematic view of a one-chip controller in FIG. 1.
Figure 3:
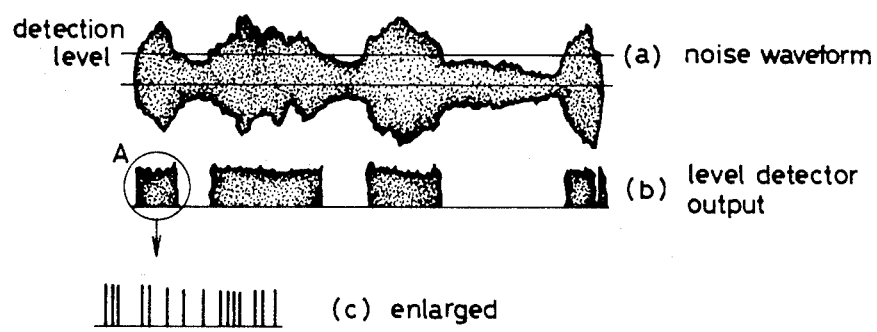
FIG. 3(a) is a waveform diagram showing noise passing over a resonance circuit, FIG. 3(b) a waveform diagram of the output of a level detector, and FIG. 3(c) an enlarged diagram of section A in FIG. 3(b)
Figure 9:
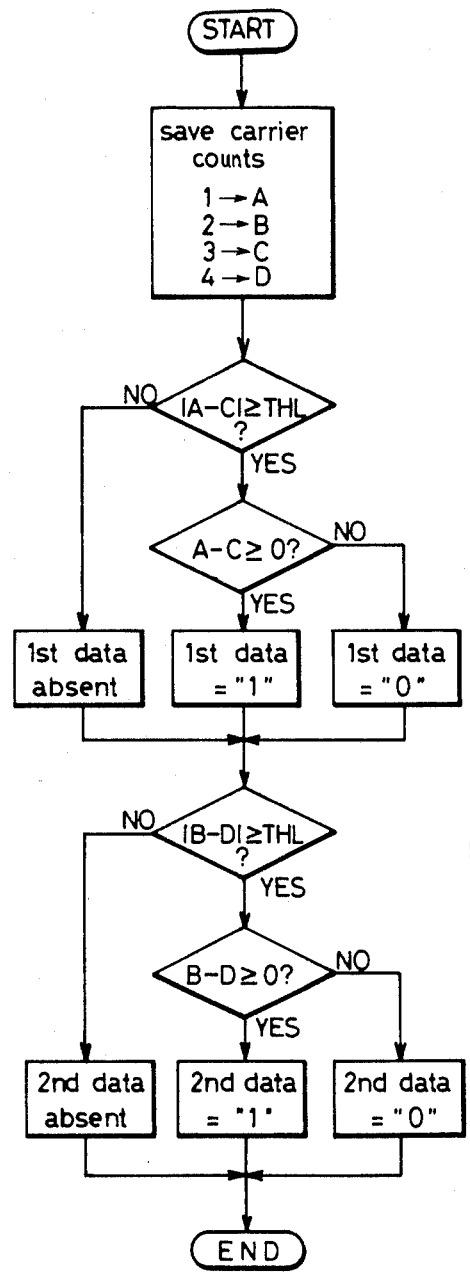
FIG. 9 is a flow chart showing another algorithm pursuant to the anternative embodiment.

The data/noise discrimination is detailed in a flow chart of FIG. 9. The counts of the carriers during the respective half-cycles within the two consecutive full cycles are saved in memory locations A to D. The carrier count during the first half-cycle is saved in the memory location A, that during the second half-cycle in the memory location B, that during the third half-cycle in the memory location C and the during the fourth half-cycle in the memory location D. It is noted that this count operation is carried out using its built-in 8-bit counter of the microcomputer 21 of FIG. 1 illustrated in in FIG. 2 which further includes an 8-bit CPU, a 1-K byte ROM, 64-byte RAM and 27 I/O lines as best shown in FIG. 3. A step is effected to decide if the differential count (|A−C|) between the first and third half-cycles A and C is greater than the threshold setting THL. If the setting is not exceeded, then the pulses in question is treated as "noise." In other words, the pulses in question are first treated as being not "signal" and excluded from an operating sequence of signal decision. As long as the threshold setting is exceeded and the result of the subtraction (A−C) is positive, the first data are regarded as "1." If the difference is negative, then the first data are considered as "0." Subsequently, the differential count (B−D) between the second and fourth half-cycles is evaluated and the second bit of data is considered as "1" or "0," based upon whether the sign of the differential count is plus or minus.

Referring to FIG. 8(e), the pulses in question during the first and third half-cycles A and C are characteristic of "10" and regarded as data "1", whereas those during the second and fourth half-cylces B and D are characteristic of "01" and regarded as data "0."

Since synchronous noise occurs mostly in a unit of the half-cycle of the power frequency as described briefly above, all that is necessary is to pay attention to only the first and second half-cycles and evaluate the differential count (A−B). This results in a simplified signal/noise decision algorithm. While in the foregoing the signal/noise decision relies upon the difference in the carrier counts, it is also possible to achieve such decision with the difference in the lengths of time during the respective half-cycles where carrier frequency components last in succession.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A signal transmission system for transmission of signals over building or house wiring, said signals being superimposed over a commercial A.C. supply and representing a signal one as the presence of an A.C. burst signal having a frequency substantially higher than that of said A.C. supply, comprising:
   means for sampling said signals in a given sampling interval;
   means for level detecting said signal to develop pulses representative of signal ones and of noise above a threshold, each said A.C. burst signal being developed as a series of consecutively appearing pulses;
   means for counting the number of consecutively appearing pulses in said signals during the sampling interval; and
   means for ignoring said pulses in said given interval as noise if the number of pulses counted during said sampling interval by said means for counting is less than a predetermined reference count and for treating the pulses as an authentic signal one if the number of pulses counted is more than said reference count.

2. A signal transmission system according to claim 1 wherein 2-bit binary signal codes "10" and "01", are representative of a data "1" or a data "0" respectively, each said binary signal code comprising a signal one and a signal zero each developed in a pair of corresponding half cycles in two consecutive full cycles of a utility power voltage for signal transmission;
   wherein the number of pulses of signal data is counted in a first half cycle of a first full cycle and reduced by the number of pulses counted during a first half cycle, corresponding to said first half cycle of said first full cycle, in a next consecutive second full cycle to produce a difference signal; and
   wherein the resulting difference signal is further used to determine whether the pulses now received are noise or data signals.

3. A signal transmission system for transmitting an information signal over the power wiring of a building or house, said information signal representing a signal one as an A.C. burst signal, comprising:
   means for sampling said information signal in a periodic sampling interval;
   means for level detecting said information signal to develop pulses representative of signal ones and noise above a threshold, each said A.C. burst signal being developed as a series of consecutively appearing pulses;
   a data "1" in said information signal being represented by a logical signal "1" in a first sampling interval and a logical signal "0" in a predetermined subsequent sampling interval, a data "0" in said information signal being represented by a logical signal "0" in a said first sampling interval and a logical signal "1" in a said predetermined subsequent sampling interval;
   means for subtracting the pulse count of said subsequent sampling interval from the pulse count of said first sampling interval to produce a pulse difference count; and
   means for determining if an information signal or noise is present in said sampling intervals by comparing said pulse difference count from a predetermined reference count and for determining the presence of said information signal if said difference count is greater than said predetermined reference count.

4. A method of transmitting signals over building or house wiring, said signals representing a signal one as an A.C. burst signal, comprising the steps of:
(a) sampling said signals in question in a given sampling interval;
(b) level detecting said signals to develop pulses representative of signal ones and of noise above a threshold, each said A.C. burst signal being developed as a series of consecutively appearing pulses counting the number of consecutively appearing pulses in said signals during the sampling interval; and
(c) ignoring said pulses in said given interval as noise if the number of pulses counted in said step (b) during said sampling interval is less than a predetermined reference count and for treating the pulses as an authentic signal one if the number of pulses counted is more than said reference count.

5. A method of transmitting an information signal over the power wiring of a building or house, said information signal representing a signal one as an A.C. burst signal, comprising:
sampling said information signal using a periodic sampling interval;
level detecting said information signal to develop pulses representative of signal ones and of noise above a threshold, each said A.C. burst signal being developed as a series of consecutively appearing pulses;
counting the consecutively appearing pulses detected in each said sampling interval;
a data "1" in said information signal being represented by a logical signal "1" in a first sampling interval and a logical signal "0" in a predetermined subsequent sampling interval, a data "0" in said information signal being represented by a logical signal "0" in a said first sampling interval and a logical signal "1" in a said predetermined subsequent sampling interval;
counting the number of pulses in each said sampling interval to produce a pulse count for each said interval;
subtracting the pulse count of said subsequent sampling interval from the pulse count of said first sampling interval to produce a pulse difference count; and
determining if an information signal or noise is present in said sampling intervals by comparing said pulse difference count from a predetermined reference count and for determining the presence of said information signal if said difference count is greater than said predetermined reference count.

* * * * *